US012320673B2

(12) United States Patent
Cai et al.

(10) Patent No.: US 12,320,673 B2
(45) Date of Patent: Jun. 3, 2025

(54) SNAP-FIT HEIGHT SENSOR AND HEIGHT SENSOR ASSEMBLY

(71) Applicant: Continental Automotive Technologies GmbH, Hannover (DE)

(72) Inventors: Guozhen Cai, Changchun (CN); Xiangru Meng, Changchun (CN); Yao Wang, Chaoyangdistrict (CN)

(73) Assignee: Continental Automotive Technologies Gmbh, Hannover (DE)

( * ) Notice: Subject to any disclaimer, the term of this patent is extended or adjusted under 35 U.S.C. 154(b) by 286 days.

(21) Appl. No.: 18/061,829

(22) Filed: Dec. 5, 2022

(65) Prior Publication Data
US 2023/0175828 A1 Jun. 8, 2023

(30) Foreign Application Priority Data
Dec. 3, 2021 (CN) .......................... 202123023140.5

(51) Int. Cl.
| | |
|---|---|
| *G01D 11/30* | (2006.01) |
| *B60G 7/00* | (2006.01) |
| *B60G 17/019* | (2006.01) |
| *F16B 21/08* | (2006.01) |
| *G01B 7/00* | (2006.01) |
| *G01B 7/315* | (2006.01) |

(52) U.S. Cl.
CPC ............. *G01D 11/30* (2013.01); *B60G 7/001* (2013.01); *B60G 17/019* (2013.01); *F16B 21/08* (2013.01); *G01B 7/001* (2013.01); *G01B 7/315* (2013.01); *B60G 2204/11* (2013.01); *B60G 2400/252* (2013.01); *G01B 2210/16* (2013.01)

(58) Field of Classification Search
CPC ........ G01D 11/24; G01D 11/30; G01B 7/001; G01B 7/003; G01B 7/02; G01B 2210/16; B60G 2400/252; B60G 2204/11; B60G 17/019
See application file for complete search history.

(56) References Cited

U.S. PATENT DOCUMENTS
2020/0256719 A1    8/2020   Kato

FOREIGN PATENT DOCUMENTS

| DE | 102013011667 A1 * | 1/2015 | ............. G01D 11/30 |
| DE | 102014218756 A1 * | 3/2016 | ........... B60G 17/019 |
| JP | 2012230119 A | 11/2012 | |

OTHER PUBLICATIONS

European Search Report dated Apr. 5, 2023, for the counterpart European Patent Application No. 22205689.7.
European Examination Report dated Feb. 3, 2025 corresponding to European Patent Application No. 22205689.7.

* cited by examiner

*Primary Examiner* — Benjamin R Schmitt

(57) ABSTRACT

A snap-fit height sensor and a height sensor assembly. The snap-fit height sensor is fixed to a base by means of a mounting support. The height sensor comprises a sensor body and a swing arm capable of swinging relative to the sensor body. An engagement seat is provided on the sensor body, the engagement seat being capable of receiving the mounting support and being fitted and fixed to the mounting support. The snap-fit height sensor and height sensor assembly provided in the present utility model overcome the shortcomings in the prior art, such that the mounting support and sensor have a small mounting volume, a light weight and a low cost, with simple mounting steps, few components and high efficiency.

8 Claims, 2 Drawing Sheets

SNAP-FIT HEIGHT SENSOR AND HEIGHT SENSOR ASSEMBLY

CROSS-REFERENCE TO RELATED APPLICATIONS

The present application claims priority under 35 U.S.C. § 119(a) from Chinese Patent Application No. 202123023140.5 filed on Mar. 12, 2021, in the Chinese Patent Office, the disclosure of which is herein incorporated by reference in its entirety.

BACKGROUND

1. Field

Embodiments of the present application relate to the technical field of sensors, in particular to a snap-fit height sensor and a height sensor assembly.

2. Description of Related Art

A height sensor is a component that is commonly used on vehicles to measure chassis height. An existing chassis height sensor needs to be fitted to a mounting support with two bolts. To enable such fixing with bolts, bolt installation holes need to be reserved in both the mounting support and a sensor housing. This will inevitably increase the size, weight and cost of both the mounting support and the sensor housing. Moreover, the need to install two bolts increases the number of components and bolt assembly steps, thus further increasing costs.

SUMMARY

To overcome the shortcomings in the prior art, embodiments of the present application provide a snap-fit height sensor and a height sensor assembly, such that the mounting support and sensor have a small mounting volume, a light weight and a low cost, with simple mounting steps and few components.

To achieve the abovementioned objective, embodiments of the present application propose a snap-fit height sensor, fixed to a base by means of a mounting support, the height sensor comprising a sensor body and a swing arm capable of swinging relative to the sensor body. An engagement seat is provided on the sensor body, the engagement seat being capable of receiving the mounting support and being fitted and fixed to the mounting support.

Furthermore, the engagement seat is disposed on a side of the sensor body that is remote from the swing arm.

Furthermore, the engagement seat has two sidewalls spaced apart opposite each other and a top wall, lower ends of the two sidewalls being fixed to a surface of the sensor body, and the top wall being provided between upper ends of the two sidewalls; among themselves, the two sidewalls, the top wall and the sensor body together define an accommodating cavity for insertion of the mounting support.

Furthermore, a snap-fit part is further formed on the top wall, an opening is formed on the mounting support, and the snap-fit part is engageable with the opening on the mounting support, to limit movement of the mounting support.

Furthermore, the two sidewalls and top wall of the engagement seat extend in the direction of extension of the sensor body, such that the mounting support is insertable into the accommodating cavity of the engagement seat in the direction of extension of the sensor body.

Furthermore, the engagement seat further has a stop wall located between the top wall and the two sidewalls, the stop wall being capable of abutting an insertion end of the mounting support to limit the depth of insertion of the mounting support in the accommodating cavity.

Furthermore, the engagement seat and the sensor body are integrally formed by injection molding.

To achieve the abovementioned objective, embodiments of the present application further provide a height sensor assembly, comprising a mounting support and the abovementioned snap-fit height sensor.

Furthermore, an end of the mounting support that is inserted into the engagement seat has a shoulder, the shoulder being capable of abutting a sidewall of the engagement seat after the mounting support is inserted into the engagement seat, to limit the depth of insertion of the mounting support.

Furthermore, the base is connected to a vehicle body or the base is a vehicle body, and an end of the mounting support is inserted into the engagement seat on the snap-fit height sensor.

Compared with the prior art, the snap-fit height sensor and height sensor assembly provided in the present utility model enable the snap-fit height sensor to be fixed to the mounting support directly using a snap-fit insertion connection, with no need to use bolts to fixing. This obviously solves the problem of excessively large volume caused by reserving bolt installation holes and other structures, while also reducing the number of installed components and steps, such that the mounting support and sensor have a small mounting volume, a light weight and a low cost, with simple mounting steps, few components and high efficiency.

DETAILED DESCRIPTION

Embodiments of the present application are explained further below with reference to the drawings.

Many specific details are expounded in the following description so that those skilled in the art can understand the present utility model more comprehensively. However, it will be obvious to those skilled in the art that embodiments of the present application can be realized without some of these specific details. In addition, it should be understood that the application is not limited to the specific embodiments described. On the contrary, consideration may be given to the use of any combination of the following features and key elements to implement the present application, regardless of whether they relate to different embodiments. Therefore, the following aspects, characteristics, embodiments and advantages only serve an illustrative purpose, and should not be regarded as key elements or limitations of the claims, unless expressly specified in the claims. Furthermore, if words indicating direction such as up/down/left/ right, upper side, lower side, etc. appear herein, this is purely for convenience of expression in accordance with the relative positions of components in the current drawings, and should not be interpreted as limiting the scope of protection.

Figure 1:
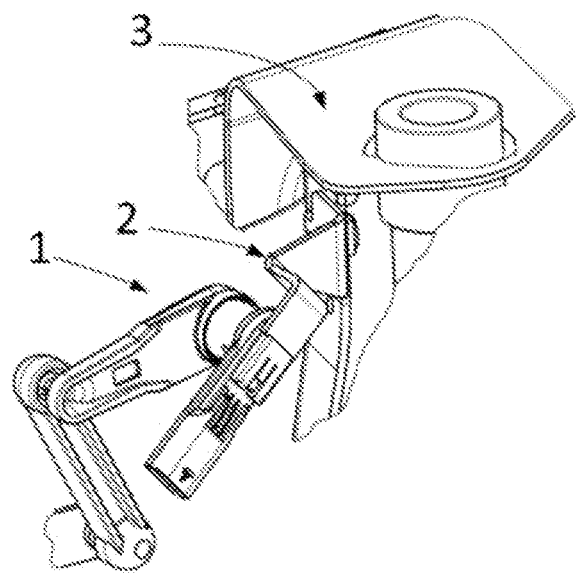
FIG. 1 is a schematic drawing of the height sensor assembly in a mounted state in an embodiment of the present application.

FIG. 1 is a schematic drawing of the height sensor assembly in a mounted state in an embodiment of the present application.

Referring to FIG. 1, in an embodiment of the present utility model, a height sensor assembly is proposed, comprising a snap-fit height sensor 1 and a mounting support 2. One end of the mounting support 2 is fixed to a base 3, and another end of the mounting support 2 is fixed to the snap-fit height sensor 1. The base 3 may be a vehicle body chassis structure or another structure capable of fixing the mounting support 2. The snap-fit height sensor 1 is used to measure variation in the chassis height of a vehicle, or in other scenarios requiring height measurement.

Figure 2:
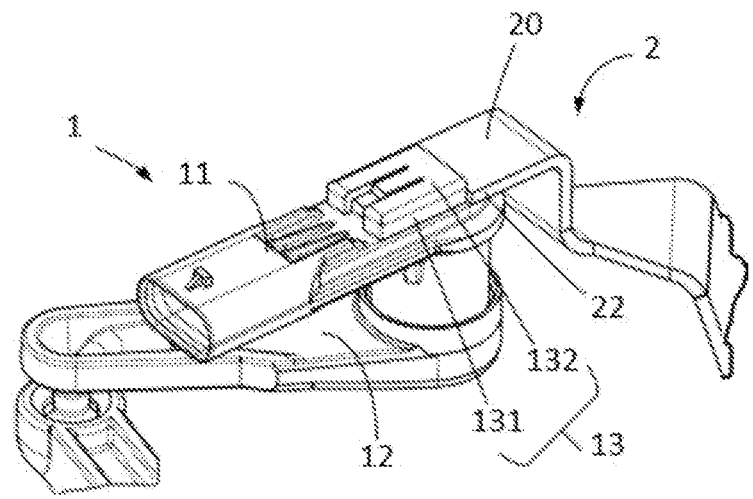
FIG. 2 is a three-dimensional schematic drawing of the height sensor assembly in an embodiment of the present application.
Figure 3:
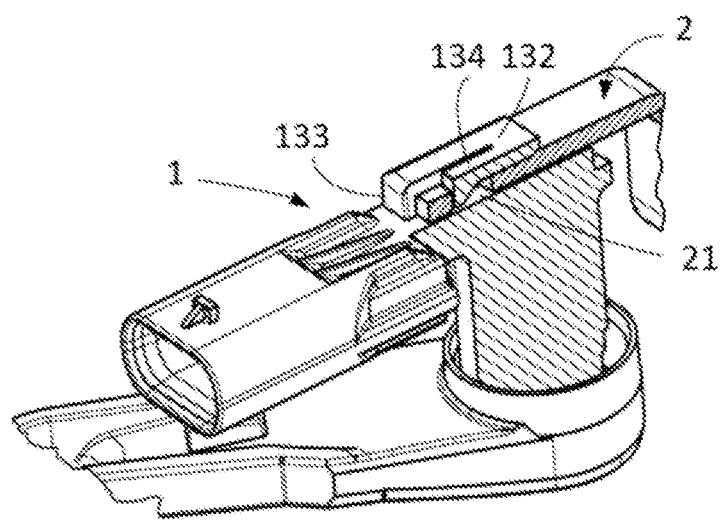
FIG. 3 is a sectional drawing of an engagement region between the snap-fit height sensor and the mounting support in FIG. 2.

FIG. 2 is a three-dimensional schematic drawing of the height sensor assembly in an embodiment of the present application; and FIG. 3 is a sectional drawing of an engagement region between the snap-fit height sensor and the mounting support in FIG. 2.

Referring to FIGS. 2 and 3, the snap-fit height sensor 1 in this embodiment comprises a sensor body 11, and a swing arm 12 capable of swinging relative to the sensor body 11. An engagement seat 13 is further provided on the sensor body 11, for example on an outer surface at a side of the sensor body 11 that is remote from the swing arm 12. The engagement seat 13 can receive an insertion end 20 of the mounting support 2 and be fixed to the mounting support 2 in a tight fit.

The engagement seat 13 comprises two sidewalls 131 which are spaced apart opposite each other, and a top wall 132. Lower ends of the two sidewalls 131 are fixed to the outer surface of the sensor body 11, and the top wall 132 is provided between upper ends of the two sidewalls 131. Among themselves, the two sidewalls 131, the top wall 132 and the outer surface of the sensor body 11 together define an accommodating cavity (not marked in the figures) for insertion of the mounting support 2. Furthermore, the two sidewalls 131 and top wall 132 of the engagement seat 13 extend in the direction of extension of the sensor body 11, such that the mounting support 2 can be inserted into the accommodating cavity of the engagement seat 13 in the direction of extension of the sensor body 11. This arrangement can further reduce the space taken up when the height sensor assembly is mounted on the vehicle body.

Referring to FIG. 3, furthermore, the engagement seat 13 also has a stop wall 133 located between the top wall 132 and the two sidewalls 131.

The stop wall 133 can abut the insertion end 20 of the mounting support 2 to limit the depth of insertion of the mounting support 2 in the accommodating cavity. Furthermore, a snap-fit part 134 is also formed on the top wall 132, and an opening 21 is formed on the mounting support 2; the snap-fit part 134 can engage with the opening 21 on the mounting support 2, to limit movement of the mounting support 2 and thereby prevent detachment of the mounting support 2 from the engagement seat 13.

Figure 4:
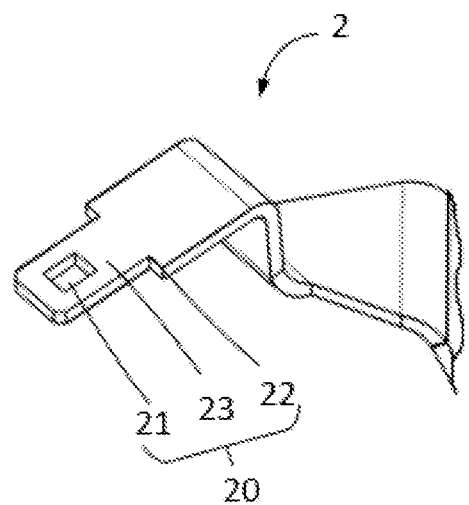
FIG. 4 is a schematic drawing of the mounting support in an embodiment of the present application.

FIG. 4 is a schematic drawing of the mounting support in a preferred embodiment of the present utility model.

Referring to FIGS. 3 and 4, in this embodiment, a head of the insertion end 20 of the mounting support 2 is provided with a tongue 23, the opening 21 is provided on the tongue 23, and the tongue 23 is inserted into the engagement seat 13 to fix the sensor body 11. The width of the tongue 23 is less than the width of a body of the insertion end 20, such that a shoulder 22 is formed at each of two sides of the junction of the tongue 23 with the body of the insertion end 20. The shoulders 22 can abut the sidewalls 131 of the engagement seat 13 after the insertion end 20 of the mounting support 2 is inserted into the engagement seat 13, to limit the insertion depth of the mounting support 2.

The snap-fit part 134, stop wall 133 and shoulder 22 of the present utility model can limit displacement of the mounting support 2 relative to the sensor body 11 more effectively, such that the connection and fit between the mounting support and the sensor body is more stable, and wobbling or detachment is avoided.

Furthermore, the body 11 and engagement seat 13 in this embodiment are both made by injection molding of resin material, and are integrally formed by injection molding. Of course, there is no limitation to this; in other embodiments, the sensor body 11 and the engagement seat 13 may also be separately made from other materials and fixedly connected in another way.

Although the present application has been disclosed above through preferred embodiments, it is by no means limited to these. Various changes and modifications made by any person skilled in the art without departing from the spirit and scope of the present application shall be included in the scope of protection of the present application, and therefore the scope of protection of the present application shall be the scope defined by the claims.

The invention claimed is:

1. A snap-fit height sensor comprising:
    a sensor body, the sensor body comprising an engagement seat defining a cavity into which a mounting support of the snap-fit height sensor is configured to be inserted, wherein the engagement seat comprises:
        a first sidewall and a second sidewall opposing the first sidewall, the first sidewall and the second sidewall defining a width of the engagement seat; and
        a top sidewall interconnecting the first sidewall and the second sidewall, the top sidewall comprising a snap-fit part extending outward from the top sidewall towards an interior of the engagement seat between the first sidewall and the second sidewall, the snap-fit part configured to be coupled to a snap-fit opening of the mounting support; and
    a swing arm configured to swing relative to the sensor body.

2. The snap-fit height sensor as claimed in claim 1, wherein the engagement seat is disposed on a side of the sensor body that is remote from the swing arm.

3. The snap-fit height sensor as claimed in claim 1, wherein lower ends of the first sidewall and the second sidewall are fixed to a surface of the sensor body.

4. The snap-fit height sensor as claimed in claim 3, wherein the snap-fit part is configured to engage into the snap-fit opening on the mounting support.

5. The snap-fit height sensor as claimed in claim 3, wherein the first sidewall, the second sidewall, and the top wall of the engagement seat extend in a direction of extension of the sensor body.

6. The snap-fit height sensor as claimed in claim 3, wherein the engagement seat further comprises a stop wall interconnected between distal ends of the first sidewall and the second sidewall, the stop wall configured to abut an insertion end of the mounting support to limit the depth of insertion of the mounting support in the engagement seat.

7. The snap-fit height sensor as claimed in claim 1, wherein the engagement seat and the sensor body are integrally formed by injection molding.

8. The snap-fit height sensor as claimed in claim 1, wherein the mounting support comprises a bracket.

\* \* \* \* \*